April 23, 1935. G. O. TOEPFER Re. 19,546

HUMIDIFIER

Original Filed March 20, 1930

Inventor
George O. Toepfer
By
Attorneys

Reissued Apr. 23, 1935

Re. 19,546

UNITED STATES PATENT OFFICE 19,546

HUMIDIFIER

George O. Toepfer, Milwaukee, Wis.

Original No. 1,839,618, dated January 5, 1932, Serial No. 437,355, March 20, 1930. Application for reissue December 26, 1933, Serial No. 704,031

6 Claims. (Cl. 261—15)

This invention relates to an air humidifier especially designed and adapted for use in dwellings although also adapted for universal application.

One of the principal objects of the invention is to provide an air humidifier which is adapted for organization with the smoke pipe or flue of the heating plant and which while of extremely simple and durable construction is nevertheless reliable, automatic and effective in operation in that it properly humidifies or moistens the air and insures its natural circulation throughout the rooms of the dwelling.

In carrying out the present invention a single enclosure or casing surrounds a portion of the smoke pipe or flue leading from the heating plant. Internally the enclosure is divided by a baffle or partition into an air heating chamber and a vapor generating chamber. The air inlet is to the lower side of the air heating chamber and the distributing system for the humidified air connects to the upper portion of the vapor generating chamber at the end thereof remote from the air heating chamber so that the air is constrained to travel through the entire extent of the air heating chamber and around the portion of the heated smoke pipe or flue extending therethrough and then passes throughout the full length of the vapor generating chamber and out through the distributing system. During its travel through the vapor generating chamber the heated air becomes saturated with the heated vapor therein and after thus being humidified is carried by the distributing system into one of the rooms on the lower floor of the house and circulates throughout the entire interior of the dwelling.

In the vapor generating chamber means is provided for creating a finely divided mist or heated vapor and may consist of a spray system having nozzles supplied with water under the control of an electromagnetic valve embodied in one of the electrical circuits of an oil burner and consequently opened when the oil burner is in operation. The vapor generating means may also consist of a float controlled water supply valve which maintains a constant level of water around the portion of the heated smoke pipe or flue extending through the vapor generating chamber. As the water is constantly heated a vapor or mist will rise from the surface thereof and into the path of the heated air. Preferably, the portions of the smoke pipe extending through the air heating and vapor generating chamber are corrugated to increase the heat radiating surfaces thereof. The portion of the smoke pipe in the vapor generating chamber may have transverse tubes to augment the heating action thereof.

Figure 1:
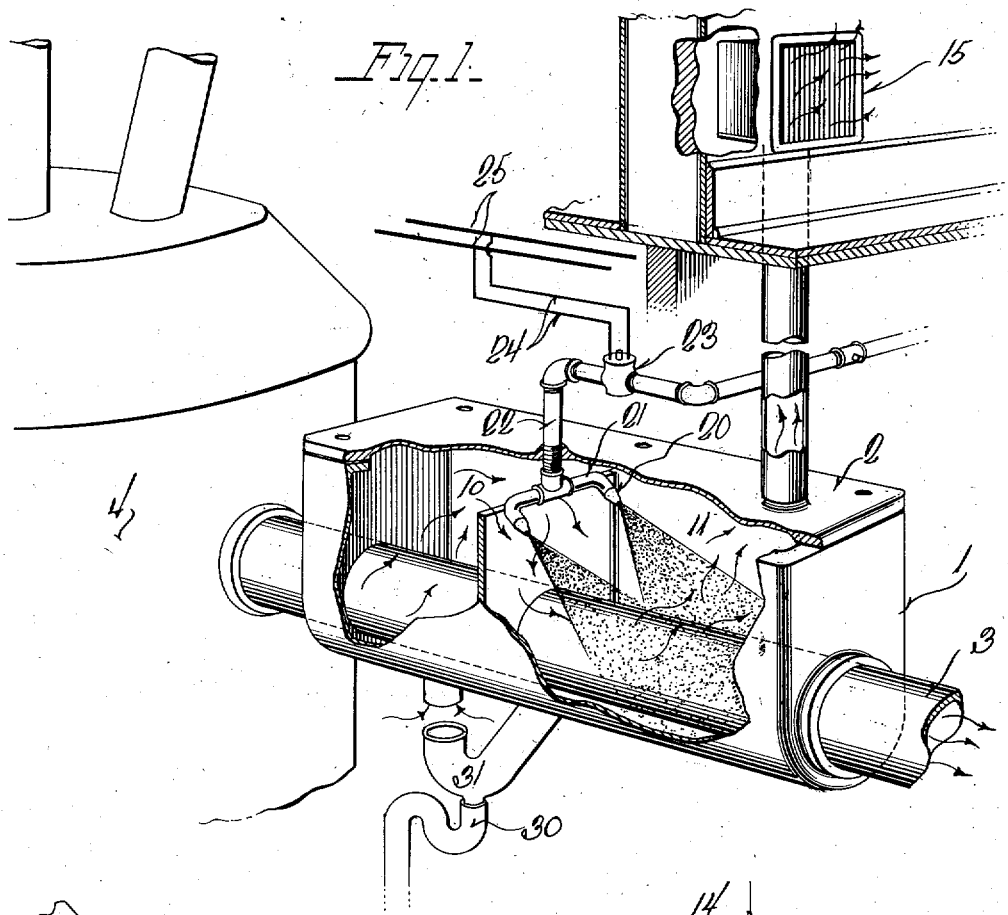
Figure 2:
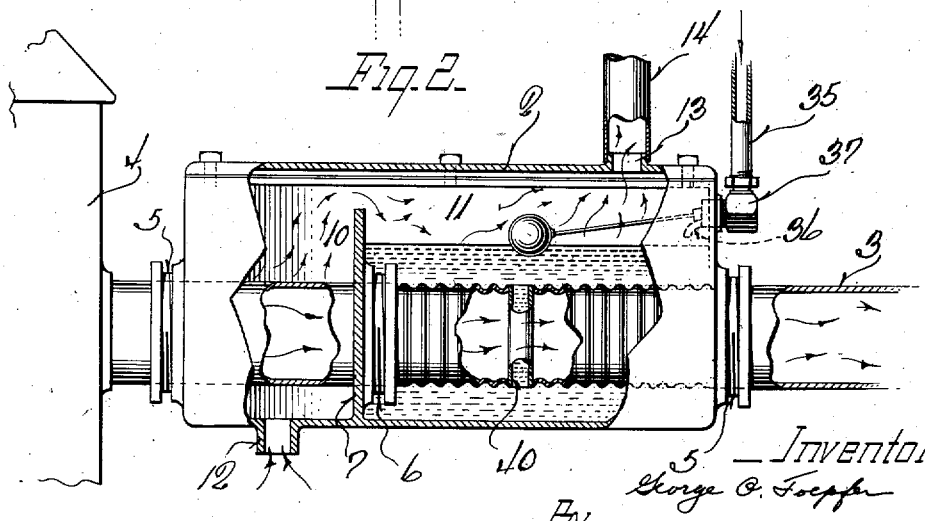

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary perspective view showing one type of construction embodying my invention, parts being broken away and shown in section for the sake of illustration; and Figure 2 is a view partly in side elevation and partly in vertical section showing another construction embodying my invention.

Referring to the drawing, it will be seen that in both forms of the invention an enclosure or casing designated generally at 1 is provided and may have a removable top or cover 2 which in use is firmly secured to the main portion of the casing. The casing 1 is supported upon a section of a smoke pipe or flue designated generally at 3, the smoke pipe extending from the heating plant designated diagrammatically at 4. As shown in the drawing, the sections of the smoke pipe 3 upon which the casing 1 is supported extends longitudinally through the interior of the casing, that is, through suitably packed openings 5 in the end walls of the casing and also through a suitably packed opening 6 provided in an internal partition or baffle 7. The partition or baffle 7 extends between and is integral with or suitably connected to the side walls and is also integral with or connected to the bottom wall of the casing but it terminates short of the top wall of the casing. As will be understood from the drawing the partition 7 separates the interior of the casing 1 into an air heating chamber or space 10 and a vapor generating space 11, the air heating chamber communicating with the vapor generating space over the top of the baffle or partition 7.

In the portion of the bottom wall of the casing 1, which communicates with the air heating chamber, an air inlet 12 is provided. In the top or cover 2 an outlet nipple 13 for the humidified air is provided and connects to a pipe 14 forming part of a distributing system which preferably includes, as shown in Figure 1, a register 15 located in the lower portion of one of the rooms of the first floor of the dwelling. The outlet nipple 13 is located at the end of the vapor generated chamber remote from the air heating chamber.

In both forms of the invention means is provided for producing a vapor or mist in the vapor generating chamber so that the air which enters through the inlet 12 and is heated during its travel around a portion of the smoke pipe extending through the chamber 10 will travel through this mist or spray and be humidified or moistened thereby during its passage to the distributing system.

In Figure 1 this means is shown as comprising a plurality of spray nozzles 20 which are positioned adjacent the partition 7 and which incline downwardly and inwardly into the vapor generating chamber. The nozzles 20 may be of any suitable construction and are carried on branches 21 of a water supply pipe 22. An electromagnetic valve 23 is incorporated in the water supply pipe. Normally, this valve 23 is biased (as by a spring, not shown) to closed position but when the windings of its magnet are energized it is automatically opened. The details of the construction of the valve are not shown as this type of valve is well known and widely used for various purposes. The windings of the electromagnetic valve are connected by wires 24 across wires 25 embodied in one of the electrical circuits of an oil burner or the like so that whenever the oil burner is in operation the current flowing through the wires 25 will flow in part through wires 24 and consequently through the windings of the magnet to energize the magnet and open the valve. When the valve 23 is opened finely divided sprays issue from the nozzles 20 and strike against the heated smoke pipe 3. This results in the generation of the vapor which fills the interior of the vapor generating chamber and acts to appropriately moisten the heated air traveling therethrough. A drain pipe 30 may be connected with the lower portion of the chamber 11 of the form of the invention shown in Figure 1 to carry off any condensate, that may be formed. The drain pipe 30 preferably has a trap 31 embodied therein.

In the form of the invention shown in Figure 2 a different means is shown for generating the mist or vapor in the upper portion of the chamber 11. As illustrated, this means consists of a water supply pipe 35 having a downwardly directed discharge nipple 36. Between the nipple 36 and its supply pipe 35 a float controlled valve 37 of any conventional or suitable construction is interposed. This valve 37 operates to maintain a constant level of water in the chamber 11, the water surrounding at least a portion of the smoke pipe or flue 3 extending through the chamber 11 and being heated thereby.

In both forms of the invention the section of the smoke pipe organized with the casing 1 may be corrugated as, for example, as illustrated in Figure 2, for the purpose of increasing the heating effect. The heating action of the smoke pipe on the water may be further augmented by providing transverse tubes 40, as illustrated in Figure 2.

In either form of the invention the portion of the smoke pipe in the air heating chamber heats the air therein and the air, under the influence of natural convection currents, rises through the air heating chamber 10 and passes through the upper portion of the vapor generating chamber 11 and up through the pipe 14 and out through the register 15 and into the interior of the dwelling through which it naturally circulates. During its travel through the upper portion of the vapor generating chamber it passes through the mist created therein and is thoroughly humidified. In either form of the invention the creation of the mist is automatically maintained whenever the smoke pipe is heated or in other words whenever there is need for humidifying the air. In the form of the invention shown in Figure 1 the smoke pipe in the chamber 11 is sprayed whenever the oil burner is in operation. In the form of the invention shown in Figure 2 there is a constant level of water maintained in the chamber 11 and whenever the hot gas travels through the smoke pipe this water is heated and a vapor or mist produced. It is to be noted that in both forms of the invention the heated air is constrained to travel throughout the entire length of the heating chamber.

The invention claimed is:

1. A humidifier for use with a heating plant having a smoke pipe and comprising a casing having a transverse internal partition dividing the casing into an air heating chamber and a vapor generating chamber, said chambers being spaced longitudinally of the casing, said partition terminating short of the top of the casing to provide for flow of the heated air from the air heating chamber into the vapor generating chamber, the ends of the casing and the partition having openings through which the smoke pipe extends, an air inlet into the air heating chamber, means for creating a vapor in the vapor generating chamber and comprising spray nozzles for directing sprays against the portion of the smoke pipe in the vapor generating chamber, and a distributing system connected to the vapor generating chamber.

2. A humidifier for use with a heating plant having a smoke pipe and comprising a casing having an integral partition dividing the casing into an air heating chamber and a vapor generating chamber, the ends of the casing and the partition having openings through which the smoke pipe extends, an air inlet into the air heating chamber, means for creating a vapor in the vapor generating chamber and comprising spray nozzles for directing sprays against the portion of the smoke pipe in the vapor generating chamber, a water supply pipe for supplying the spray nozzles with water and an electromagnetically controlled valve for regulating the flow of water through said supply pipe.

3. A humidifier for use with a heating plant having a smoke pipe and comprising a casing having a transverse internal partition dividing the casing into an air heating chamber located at one end of the casing and a vapor generating chamber located at the other end thereof, the ends of the casing and the partition having openings through which the smoke pipe extends, said partition terminating below the top of the casing to provide for flow of the heated air from the air heating chamber to the vapor generating chamber, an air inlet into the air heating chamber, means for creating a vapor in the vapor generating chamber and a distributing system connected to the vapor generating chamber.

4. A humidifier for use with a heating plant having a smoke pipe and comprising a casing made up of side walls, a bottom wall, end walls and a top, said casing having a transverse internal partition located intermediate its ends and extending between the side walls and connected to the bottom wall but terminating short of the top wall, said end walls and said partition having longitudinally alined openings through which the smoke pipe extends, said partition dividing said casing internally into an air heating chamber located at one end of the casing and a vapor generating chamber located at the other end of the casing, an air inlet to the lower end of the air heating chamber, means for creating a vapor in the vapor generating chamber and a distributing system connected to the upper portion of the vapor generating chamber at a point remote from the air heating chamber.

5. The combination with a furnace having a smoke flue, of a vessel having a water chamber, a section of said flue passing through said vessel and through said water chamber, said vessel having a vapor space above and open to the water chamber, a vapor conduit communicating with said vapor space, and a cold air pipe having an inlet below the level of said water and discharging into said vapor space below the top of said water chamber.

6. The combination in a humidifier, of a vessel, a smoke flue extending through the lower portion of said vessel, said vessel having a water chamber surrounding said smoke flue, means for maintaining a predetermined level of water in said vessel, a division wall extending transversely of said vessel at one end of said water chamber to form a cold air passage below the top of said water chamber, a cold air pipe communicating with said passage and leading from a point below said vessel, and a vapor conduit communicating with the space above said water chamber at a point removed from said cold air passage.

GEORGE O. TOEPFER.